US012231982B2

(12) United States Patent
Chow et al.

(10) Patent No.: US 12,231,982 B2
(45) Date of Patent: *Feb. 18, 2025

(54) SYSTEMS AND METHODS FOR DYNAMIC CHANNEL BONDING

(71) Applicant: MOBOPHILES, INC., Sunnyvale, CA (US)

(72) Inventors: William Weiyeh Chow, Los Angeles, CA (US); Mark Lea Tsuie, Canoga Park, CA (US); Brian Alex Truong, Cerritos, CA (US)

(73) Assignee: MOBOPHILES, INC., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/444,522

(22) Filed: Feb. 16, 2024

(65) Prior Publication Data

US 2024/0251314 A1    Jul. 25, 2024

Related U.S. Application Data

(60) Continuation of application No. 17/228,275, filed on Apr. 12, 2021, now Pat. No. 11,937,141, which is a
(Continued)

(51) Int. Cl.
*H04W 36/14* (2009.01)
*H04L 43/0852* (2022.01)
(Continued)

(52) U.S. Cl.
CPC ......... *H04W 36/14* (2013.01); *H04L 43/0852* (2013.01); *H04L 43/0894* (2013.01);
(Continued)

(58) Field of Classification Search
CPC ... H04W 36/14; H04W 36/165; H04W 36/22; H04W 48/18; H04W 36/0011;
(Continued)

(56) References Cited

U.S. PATENT DOCUMENTS

| 6,141,686 A | 10/2000 | Jackowski et al. |
| 9,674,754 B2 | 6/2017 | Fitzpatrick et al. |

(Continued)

FOREIGN PATENT DOCUMENTS

| EP | 1962471 A1 * | 8/2008 | ........... H04L 67/306 |
| WO | WO-2010007556 A1 * | 1/2010 | ............ H04W 48/18 |

OTHER PUBLICATIONS

International Search Report and Written Opinion for International Application No. PCT/US19/35082, dated Sep. 30, 2019, 12 pages.

*Primary Examiner* — Hardikkumar D Patel
(74) *Attorney, Agent, or Firm* — Lewis Roca Rothgerber Christie LLP

(57) ABSTRACT

A method for managing network traffic on a portable communication device including a processor, a memory, and a plurality of network interfaces configured to connect to a plurality of networks includes: processing network traffic of an application running on the processor via a first network of the plurality of networks, the first network being specified as a primary network by an operating system running on the processor; monitoring a plurality of network status information associated with the first network; detecting a problem of the first network when one or more parameters of the received network status information is outside of one or more threshold values; in response to detecting the problem in the first network, selecting a second network of the plurality of networks as the primary network; and processing the network traffic via the second network as the updated primary network.

22 Claims, 7 Drawing Sheets

Related U.S. Application Data division of application No. 16/428,939, filed on May 31, 2019, now Pat. No. 11,012,908.

(60) Provisional application No. 62/678,810, filed on May 31, 2018.

(51) Int. Cl.
| | |
|---|---|
| *H04L 43/0894* | (2022.01) |
| *H04L 45/00* | (2022.01) |
| *H04L 45/28* | (2022.01) |
| *H04W 36/16* | (2009.01) |
| *H04W 36/22* | (2009.01) |
| *H04W 48/18* | (2009.01) |
| *H04W 36/00* | (2009.01) |

(52) U.S. Cl.
CPC .............. *H04L 45/22* (2013.01); *H04L 45/28* (2013.01); *H04W 36/144* (2023.05); *H04W 36/165* (2013.01); *H04W 36/22* (2013.01); *H04W 48/18* (2013.01); *H04W 36/0011* (2013.01)

(58) Field of Classification Search
CPC ... H04W 84/12; H04W 8/04; H04W 28/0819; H04W 28/0958; H04W 88/06; H04L 43/0852; H04L 43/0894; H04L 45/22; H04L 45/28; H04L 43/0829; H04L 43/16
See application file for complete search history.

(56) References Cited

U.S. PATENT DOCUMENTS

| | | | |
|---|---|---|---|
| 2016/0134673 A1 | 5/2016 | MacInnis | |
| 2017/0230457 A1* | 8/2017 | Kumar | ............... G06F 16/24532 |
| 2017/0373804 A1* | 12/2017 | Han | ......................... H04W 4/70 |
| 2018/0048567 A1* | 2/2018 | Ignatchenko | ....... H04L 43/0864 |
| 2018/0338278 A1 | 11/2018 | Ketonen et al. | |

* cited by examiner

SYSTEMS AND METHODS FOR DYNAMIC CHANNEL BONDING

CROSS-REFERENCE TO RELATED APPLICATIONS

This application is a continuation application of U.S. patent application Ser. No. 17/228,275 filed Apr. 12, 2021, which is a divisional application of U.S. patent application Ser. No. 16/428,939 filed May 31, 2019, now U.S. Pat. No. 11,012,908, which claims the benefit of U.S. Provisional Patent Application No. 62/678,810, filed in the U.S. Patent and Trademark Office on May 31, 2018, the entire disclosure of each of which is incorporated by reference herein.

FIELD

Aspects of embodiments of the present invention relate to the field of computer networking.

BACKGROUND

Connection bonding or link aggregation relates to methods for combining or aggregating multiple network connections.

Under some network conditions, network connectivity on computing devices can be poor, such as when the computing devices are near or beyond the usable ranges of the networks' reach, or near or beyond the usable limits of the networks' capacity. For example, when a smartphone that is connected to a wireless local area network or WLAN (e.g., a Wi-Fi network) is moved to the edge of the effective range of the wireless network (such as when sitting in a car in the driveway at home), the smartphone will generally continue to try to transmit and request data via the wireless network rather than switch to its cellular connection, even when the connection to the wireless network is poor. This may result in a poor user experience, such as a temporary loss of network connectivity when a user is at the edges of local wireless networks, even when cellular network signal is strong. Another example is when a smartphone is connected to a wireless network that has more traffic than it can handle, such as a congested Wi-Fi network in a busy coffee shop or in a stadium during a sporting event. This may result in a poor user experience, such as hangs or timeouts when trying to access internet content.

Examples of WLAN connections include networks such as those based on IEEE 802.11 standards, also known as Wi-Fi. Examples of cellular network connections include 3G wireless cellular networks (sometimes referred to as, for example, Universal Mobile Telecommunications Service or UMTS, Global Systems for Mobile or GSM, and Code Division Multiple Access 2000 or CDMA2000) or 4G wireless cellular networks (sometimes referred to as, for example, Long Term Evolution Advanced or LTE Advanced) and the like.

There are additional issues with connecting to other types of networks like Wi-Fi, such as: performance (e.g., may be slower than the cellular connection), accessibility (e.g., may require login before granting internet access), or quality (e.g., there may be another access point with a better signal or performance). Typically, these issues are not handled well or at all by the device (including the software running on it), so users often have to manually manage these connections, including disabling or disconnecting Wi-Fi on their device to manually force the device to use the cellular connection. This results in a very poor user experience (e.g., requiring the user to remember when to turn Wi-Fi back on) and has additional consequences, such as higher cellular costs for either the user (e.g., when the user has a metered data plan) or the mobile network operator (e.g., when user has an unlimited data plan).

Devices can also connect to other network types, such as Bluetooth, or possibly future network types, any of which can cause similar issues at their edges. In general, when there are multiple, possibly different, heterogeneous networks that a device can connect to, there are challenges in how and when the device should use each of those available networks.

RELATED ART

The issues with managing the usage of multiple, possibly heterogeneous networks that are available to a device have seen other related approaches in addressing them. These range from providing user interface (UI) settings to enable manual control by the user, to software-based approaches to automate the connection to the network (e.g., Passpoint® for Wi-Fi), to controlling how and when multiple available networks are used (e.g., Multipath TCP).

For example, some comparative network protocols have been designed to leverage multiple networks concurrently, such as Multipath TCP (MPTCP), by splitting network traffic across the multiple available networks and then using an associated intermediary to recombine the split traffic downstream, enabling possibly higher performance (e.g., by load balancing data across cellular and Wi-Fi networks concurrently) and higher resiliency (e.g., by retrying/resending lost Wi-Fi packets to the cellular network). There are many such network protocols developed over the years, including proprietary ones, that follow this integrated client-server model of splitting traffic at the client and then having a server (or equivalent intermediary) downstream to recombine the traffic. However, these approaches require all device traffic to be directed through an intermediary, which can have a significant impact (e.g., high operating cost). This cost would generally be borne by the operator of one of the networks being used by the device, such as the mobile network operator (MNO), where the additional cost includes new servers and additional bandwidth (e.g., of the Wi-Fi traffic) that the MNO did not previously need to handle while that user's device was connected to the Wi-Fi network.

Another comparative approach taken is for an application to be multi-network aware, such that the application will direct its traffic over both Wi-Fi and/or cellular, either simultaneously (for performance via load balancing) or selectively (for resiliency against one network not working). For example, the Samsung® Download Booster can speed up large file downloads (>30 MB) via load balancing across cellular and Wi-Fi. However, this approach does not scale to provide general improvement to network performance across different applications (e.g., this approach does not improve web browsing or watching videos) because it is only used specifically for file downloads performed by certain apps such as a web browser). These approaches also lack the awareness to dynamically adjust the load between the available networks based on the dynamically changing performance characteristics of each network. Another comparative example is the Wi-Fi Assist feature in Apple® iOS, which can switch an app to use cellular if it detects that the Wi-Fi is unresponsive. However, this implementation needs network requests to hang or timeout before switching from Wi-Fi to cellular because it lacks the ability to quickly and seamlessly detect (e.g., in near real-time) which network is actually responsive. Also, the Apple® Wi-Fi Assist feature is restricted to the "foreground" app (i.e., the application running in the foreground that the user is currently interacting with) because it lacks policy control for either the user or MNO to control how much cellular data is used.

SUMMARY

Aspects of embodiments of the present invention relate to systems and methods for automatically managing multiple network connections in a computing device to improve network connectivity.

According to one embodiment of the present invention, a method for managing network traffic on a portable communication device including a processor, a memory, and a plurality of network interfaces configured to connect to a plurality of networks includes: intercepting, by a traffic manager running on the processor, network data to and from an application running on the processor; transmitting, by the traffic manager, an idempotent request of the network data to a server via the plurality of networks; receiving, by the traffic manager, a response to the idempotent request from the server via a first network on the plurality of networks; and selecting, by the traffic manager, the first network of the plurality of networks to use for receiving and transmitting the response to the application.

The transmitting the idempotent request to the server via the plurality of networks may include transmitting the idempotent request on a second network of the plurality of networks, and the method may further include terminating the idempotent request on the second network.

The transmitting the idempotent request to the server via the plurality of networks may include: transmitting the idempotent request to the server via one network of the plurality of networks; and transmitting the idempotent request to the server via one or more other networks of the plurality of networks in accordance with a delay.

The delay may be shorter than an application-level timeout of the application running on the portable communication device.

The delay may be set based on a typical response time to the idempotent request.

The idempotent request may be associated with a network protocol, and the delay may be set based on the network protocol associated with the idempotent request.

The delay may be set based on a size of a response to the idempotent request.

The delay may be set based on a network quality metric.

The plurality of networks may be arranged in a preference ranking, and the one or more other networks may be selected in accordance with the preference ranking.

Each of the networks may be associated with a different delay in accordance with the preference ranking.

The method may further include rearranging the plurality of networks in the preference ranking in accordance with one or more dynamic factors.

The one or more dynamic factors may include network performance.

The one or more dynamic factors may include network traffic cost.

The plurality of networks may include a plurality of different types of networks.

The types of networks may include one or more of: cellular, Bluetooth, and Wi-Fi networks.

According to one embodiment of the present invention, a method for managing network traffic on a portable communication device including a processor, a memory, and a plurality of network interfaces configured to connect to a plurality of networks includes: processing network traffic of an application running on the processor via a first network of the plurality of networks, the first network being specified as a primary network by an operating system running on the processor; monitoring a plurality of network status information associated with the first network; detecting a problem of the first network when one or more parameters of the received network status information is outside of one or more threshold values; in response to detecting the problem in the first network, selecting a second network of the plurality of networks as the primary network; and processing the network traffic via the second network as the updated primary network.

The network traffic may include a request and a response to the request, and wherein the problem in the first network is detected based on a response time between a timestamp of the request and a timestamp of the response exceeding a maximum threshold.

The detecting the problem in the first network may include: monitoring at least one of network statistics on the first network; and detecting the problem when a change in the network statistics exceeds a threshold.

The network statistics may include a packet loss rate or a bad packet rate.

The first network may be a wireless network, and the detecting the problem in the first network may include: monitoring a signal strength of the wireless network; and detecting the problem when the signal strength drops below a threshold signal strength.

The second network of the plurality of networks may be selected in accordance with a preference ranking of the plurality of networks.

The problem in the first network may be detected based on responses received on other networks before a response is received on the first network.

According to one embodiment of the present invention, a portable communication device includes a processor, a memory, and a plurality of network interfaces configured to connect to a plurality of networks, the memory storing instructions that, when executed by the processor, cause the processor to manage network traffic of the portable communication device by: intercepting, by a traffic manager running on the processor, network data to and from an application running on the processor; transmitting, by the traffic manager, an idempotent request of the network data to a server via the plurality of networks; receiving, by the traffic manager, a response to the idempotent request from the server via a first network on the plurality of networks; and selecting, by the traffic manager, the first network of the plurality of networks to use for receiving and transmitting the response to the application.

The transmitting the idempotent request to the server via the plurality of networks may include transmitting the idempotent request on a second network of the plurality of networks, and the instructions may further include instructions that cause the processor to terminate the idempotent request on the second network.

The transmitting the idempotent request to the server via the plurality of networks may include: transmitting the idempotent request to the server via one network of the plurality of networks; and transmitting the idempotent request to the server via one or more other networks of the plurality of networks in accordance with a delay.

The delay may be shorter than an application-level timeout of the application running on the portable communication device.

The delay may be set based on a typical response time to the idempotent request.

The idempotent request may be associated with a network protocol, and the delay may be set based on the network protocol associated with the idempotent request.

The delay may be set based on a size of a response to the idempotent request.

The delay may be set based on a network quality metric.

The plurality of networks may be arranged in a preference ranking, and the one or more other networks may be selected in accordance with the preference ranking.

Each of the networks may be associated with a different delay in accordance with the preference ranking.

The memory may further store instructions that, when executed by the processor, cause the processor to rearrange the plurality of networks in the preference ranking in accordance with one or more dynamic factors.

The one or more dynamic factors may include network performance.

The one or more dynamic factors may include network traffic cost.

The plurality of networks may include a plurality of different types of networks.

The types of networks may include one or more of: cellular, Bluetooth, and Wi-Fi networks.

According to one embodiment of the present invention, a portable communication device includes a processor, a memory, and a plurality of network interfaces configured to connect to a plurality of networks, the memory storing instructions that, when executed by the processor, cause the processor to manage network traffic of the portable communication device by: processing network traffic of an application running on the processor via a first network of the plurality of networks, the first network being specified as a primary network by an operating system running on the processor; monitoring a plurality of network status information associated with the first network; detecting a problem of the first network when one or more parameters of the received network status information is outside of one or more threshold values; in response to detecting the problem in the first network, selecting a second network of the plurality of networks as the primary network; and processing the network traffic via the second network as the updated primary network.

The network traffic may include a request and a response to the request, and the problem in the first network may be detected based on a response time between a timestamp of the request and a timestamp of the response exceeding a maximum threshold.

The instructions for detecting the problem in the first network may include instructions that, when executed by the processor, cause the processor to: monitor at least one of network statistics on the first network; and detect the problem when a change in the network statistics exceeds a threshold.

The network statistics may include a packet loss rate or a bad packet rate.

The first network may be a wireless network, and the detecting the problem in the first network may include: monitoring a signal strength of the wireless network; and detecting the problem when the signal strength drops below a threshold signal strength.

The second network of the plurality of networks may be selected in accordance with a preference ranking of the plurality of networks.

The problem in the first network may be detected based on responses received on other networks before a response is received on the first network.

Aspects embodiments of the present invention relate to providing improved performance by sending requests on different networks based on an active request count, including: distributing load based on ratio of active requests between different networks; dynamically adjusting ratio of active requests based on factors including: latency and bandwidth; detecting and tracking active requests of encrypted traffic, including detecting new active requests via presence of outbound/request data and request completion if sufficiently long delay since last inbound/response data.

According to one embodiment of the present invention, a method of network traffic management on a portable communication device having a computer processor and a plurality of network interfaces for transmitting or receiving data to a computer server includes: intercepting, by a traffic manager application, electronic traffic of the first data to or from a first application; tracking, by the traffic manager application, of the number of active data requests or responses for each network interface; and selecting, by the traffic manager application, the network interface to use for the delivery of first data to or from the first application to or from the server based on the number of active data exchanges.

According to one embodiment of the present invention, a method for managing traffic on a portable communication device including a processor, a memory, and a plurality of network interfaces configured to connect to a plurality of networks includes: intercepting, by a traffic manager running on the processor, network data to and from an application running on the processor; transmitting, by the traffic manager, a plurality of requests to a server, the requests being transmitted via the plurality of networks; tracking, by the traffic manager, a plurality of numbers of active data requests associated with each network interface; and selecting, by the traffic manager, a network interface of the plurality of network interfaces for transmitting the network data to the server and for receiving the network data from the server in accordance with the plurality of numbers of active data requests associated with the network interfaces.

One of the plurality of networks may be designated as a primary network, and the selecting the network interface may include: determining a number of active data requests associated with the primary network exceeds a threshold value; and selecting the network interface corresponding to another network of the plurality of networks for which the number of active data requests does not exceed the threshold value.

The selecting the network interface of the plurality of network interfaces may include: selecting a second network interface of the plurality of network interfaces; calculating a ratio of active requests in accordance with a number of active data requests associated with the network interface; and a number of active data requests associated with the second network interface; and distributing network traffic of the network data between the network interface and the second network interface in accordance with the ratio of active requests.

The method may further include dynamically adjusting the ratio of active requests in accordance with a plurality of network conditions of the plurality of networks.

The network conditions may include latency measurements corresponding to the plurality of networks.

The network conditions may include maximum bandwidth measurements corresponding to the plurality of networks.

The method may further include: detecting when a first network associated with the network interface or a second network associated with the second network interface is an unresponsive network; and dropping the unresponsive network.

Aspects of embodiments of the present invention relate to connection management, including: switching to another network when bonding (e.g., doubletap or load-balancing) detects degradation of the primary/default network; switching to another network based on doubletap (e.g. when it switches off of the primary network); and switching to another network based on load-balancing, e.g. when active requests are not completing quickly enough on the current primary network

BRIEF DESCRIPTION OF THE DRAWINGS

The accompanying drawings, together with the specification, illustrate exemplary embodiments of the present invention, and, together with the description, serve to explain the principles of the present invention.

DETAILED DESCRIPTION

Figure 1:
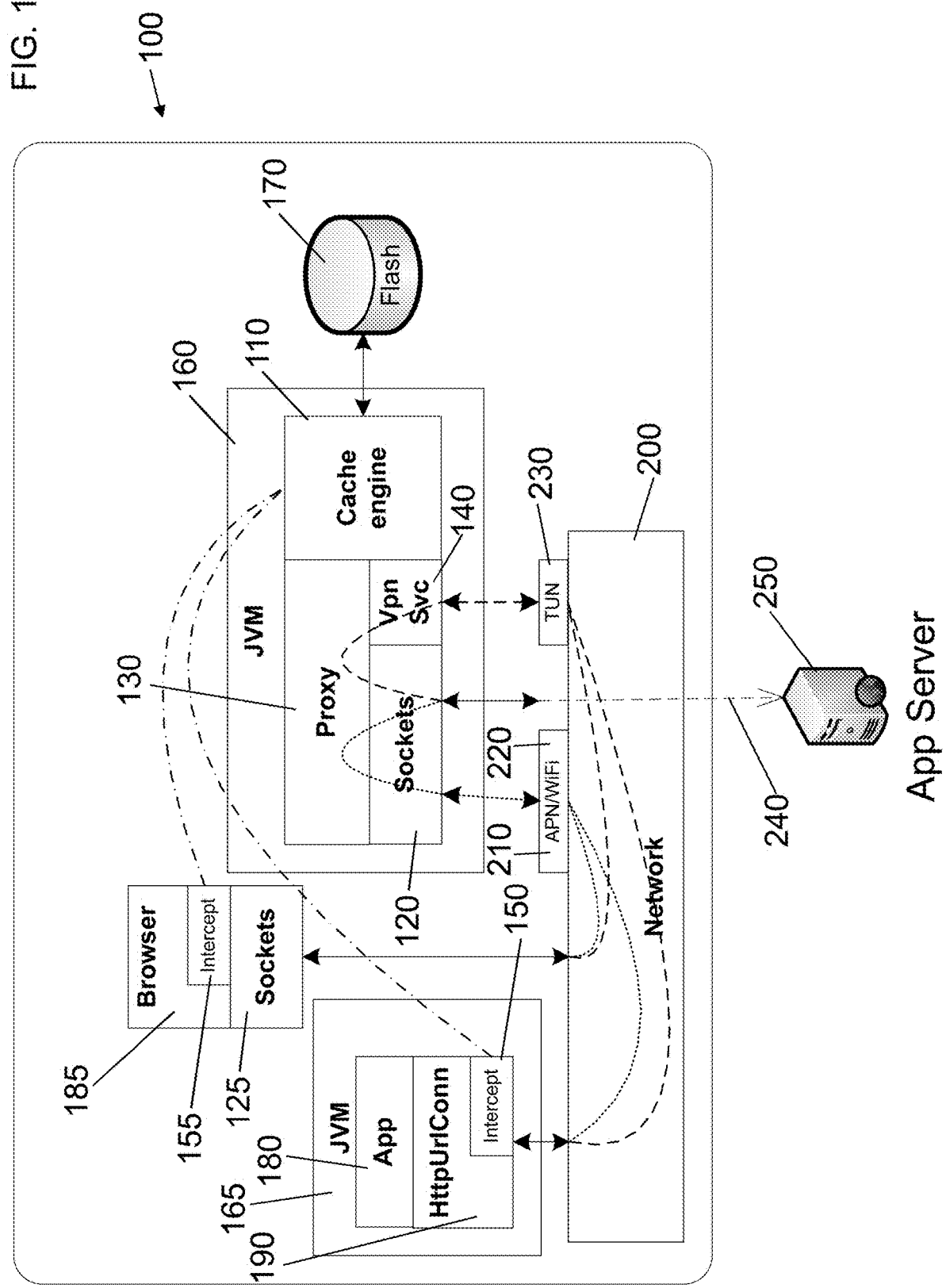
FIG. 1 is a schematic diagram of an example portable communication device architecture, such as a smartphone, suitable for use with an on-device channel bonding implementation according to an embodiment of the present invention.

In the following detailed description, only certain exemplary embodiments of the present invention are shown and described, by way of illustration. As those skilled in the art would recognize, the invention may be embodied in many different forms and should not be construed as being limited to the embodiments set forth herein.

One challenge in mobile networking is that handoff between different networks is often not seamless, such as in the case of heterogeneous networks. Use of heterogeneous networks commonly occurs when switching between different types of networks supported by the mobile device, such as switching between Wi-Fi and cellular. For example, when a mobile device is joined/attached to a Wi-Fi network, the device will stay on that Wi-Fi network and use it for network communications, even when the Wi-Fi signal is too weak (or poor) to be used for reliable communications, because it is difficult to detect that the Wi-Fi is unusable until all attempts to use it fail (e.g., after a long timeout). This state is often known as the "dead zone," where the device has no internet connectivity since it is still connected to and using (or attempting to use) a network that is not usable. This problem also occurs when switching between networks of the same type because there is often no coordination between those networks. For example, when the device is in the dead zone of one Wi-Fi network but there is another, better and usable Wi-Fi network within range, the device will not switch to the other Wi-Fi network without some kind of explicit coordination between those Wi-Fi networks. An example of explicit coordination is an "enterprise" mesh network with multiple Wi-Fi access points, typically operated by the company, and leverages handoff techniques, such as IEEE 802.11r or 802.11v. However, the user is often using unrelated Wi-Fi networks, such as in public spaces where there may be one or more overlapping or adjoining Wi-Fi networks, which are not aware of one another (e.g., not cooperating), and thus, are unable to proactively handoff a device between them. In other words, this is another case of heterogeneous networks preventing seamless handoffs.

One challenge in distributing load across multiple networks is in determining the optimal distribution of load when each network has different performance characteristics. For example, a simple load-balancing policy can often yield no improvement in performance since overall performance is dictated by the slowest path. In Table 1, below, it is assumed that a Wi-Fi Network has a speed of 40 mbps and a cellular network has a speed of 20 mbps. The table shows various calculations for elapsed time to download a 40 MB file and a 100 MB using various distributions of the load between the faster, Wi-Fi connection and the slower, cellular connection:

TABLE 1

| Wi-Fi speed | Cell speed | File size | LB % | Elapsed Time |
|---|---|---|---|---|
| 40 mbps (5 MB/s) | 20 mbps (2.5 MB/s) | 40 MB | 100% Wi-Fi | 8 s |
| | | | 50/50: | 8 s |
| | | | 20 MB on Wi-Fi = 4 s | |
| | | | 20 MB on cell = 8 s | |
| | | | Proportional: | 5.2 s |
| | | | 27 MB on Wi-Fi = 5.4 s | |
| | | | 13 MB on cell = 5.2 s | |
| | | 100 MB | 100% Wi-Fi | 20 s |
| | | | 50/50: | 20 s |
| | | | 50 MB on Wi-Fi = 10 sec | |
| | | | 50 MB on cell = 20 sec | |
| | | | Proportional: | 13.4 s |
| | | | 67 MB on Wi-Fi = 13.4 s | |
| | | | 33 MB on cell = 13.2 s | |

Table 1 illustrates that it's desirable to distribute load proportionally to the relative performance of the available networks to be able to achieve actual performance gains, e.g., a Wi-Fi network that is twice as fast as the cellular network should get twice as much traffic to significantly reduce the total wait time.

However, one problem in properly distributing load across multiple networks is determining when that is actually needed, since it is difficult for a client device to determine when it has reached the capacity of a network without attempting to generate more network load and/or traffic than the network can handle, which rarely occurs during normal usage, such as browsing web pages. Some approaches to determine that the network's capacity ceiling has been reached is to generate test traffic, such as via a "speed test" that continuously adds multiple concurrent downloads of a large test file until the total bandwidth rate no longer increases. However, this approach cannot generally be applied during normal user activity since it creates unnecessary additional load (which may impact battery life or network usage), can interfere/compete with the user's activity, and can add additional network usage cost (e.g., when using a metered network). Also, this technique does not account for dynamic changes in the available network capacity (e.g., congestion varying based on other users on the same network), and it is generally undesirable to constantly generate test traffic to continuously recalculate the current network capacity.

Accordingly, aspects of embodiments of the present invention are directed to approaches that have the ability to detect, in real-time (e.g., as needed, at the time of network usage), the quality and performance of the available networks at the end user (client) device, without requiring traffic to be split and recombined by an intermediary/server and without needing to generate network traffic to test if the current capacity of the network has been reached. Some aspects of embodiments of the present invention relate to fine-grained awareness of the available networks such that load-balancing can be adjusted dynamically to speed up different types of network traffic (e.g., not just large file downloads but also web browsing and the like), as well as to be able to failover from Wi-Fi to cellular quickly to avoid hangs and timeouts at the client.

Aspects of embodiments of the present invention relate to systems and methods for automatically managing multiple network connections in a computing device to improve network connectivity. For the sake of convenience, embodiments of the present invention will be described herein with regard to improving network connectivity in mobile devices having both wireless local area network (e.g., WLAN or Wi-Fi) connectivity and having cellular network (e.g., 3G GSM, 4G LTE) connectivity. However, embodiments of the present invention are not limited thereto and may also be applied to devices having two different network connections (e.g., a wireless local area network connection and a wired local area network connection) and devices having more than two different network connections (e.g., a third network connection such as wired local area network connection or a satellite data connection).

Example embodiments of the present invention will now be described with reference to the accompanying drawings. In the drawings, the same or similar reference numerals refer to the same or similar elements throughout. Herein, the use of the term "may," when describing embodiments of the present invention, refers to "one or more embodiments of the present invention." In addition, the use of alternative language, such as "or," when describing embodiments of the present invention, refers to "one or more embodiments of the present invention" for each corresponding item listed.

FIG. 1 is a schematic diagram of an example portable communication device (such as a smartphone) architecture 100 suitable for use with an on-device channel bonding implementation according to an embodiment of the present invention. For purposes of illustration, the portable communication device or mobile device 100 will be assumed to be an Android® smartphone. However, embodiments of the present invention are not limited thereto and may be applied to other computing devices such as smartphones and tablet computers running operating systems other than Android®, laptop computers, and the like. Further, while such mobile devices may be capable of supporting many users, for ease of description, it will be assumed that a mobile device is dedicated to a particular user, so the term "user" and "mobile device" (or any computing device used in a personal or portable manner) may be used synonymously throughout.

According to one or more embodiments of the present invention, the general architecture on portable communication devices or mobile devices (such as architecture 100) provides for a centralized proxy 130 (or traffic manager) that is configured to monitor or control the data traffic originating from applications (e.g., mobile apps, or "apps") to, for example, an application server (or app server) 250 that the mobile device accesses, e.g., via a Wi-Fi or cellular network. This approach enables channel bonding to be performed across multiple networks (e.g., Wi-Fi and cellular) and across multiple apps, and allows the channel bonding to be centrally managed, although embodiments of the present invention are not limited thereto. In other embodiments, the channel bonding may be performed privately within each app or for a particular subset of apps.

The apps and other programmable components of portable communication device 100 may be implemented, for example, as sets of computer instructions stored on a non-transitory storage device (e.g., flash memory 170) of portable communication device 100, and configured to be executed on one or more processors of the portable communication device 100. The proxy 130 may also manage traffic for particular web sites, such as from a web browser. Accordingly, for ease of description, terms such as "application," "app," "web site," or "site" may be used somewhat interchangeably throughout the present application when referring to categories of content being managed by the proxy 130.

The proxy 130 may be engaged from a number of different mechanisms, such as a proxy server (e.g., via operating system (OS) network settings) using a sockets layer 120, a virtual private network (VPN) service 140 (e.g., via OS network settings) using network tunnel (TUN) device 230, or embedded within an app using interception layer 150. The proxy 130 may be run on a Java virtual machine (JVM), Android® Runtime (ART), or other managed runtime environment 160 or may run directly on the operating system without a managed runtime environment. The proxy 130 may include a cache engine 110 for managing cached content on a physical storage device, such as flash memory 170 or other nonvolatile storage device. Without loss of generality, such a device may sometimes be referred to as a "disk," though it could be any type of non-transitory storage device, such as a solid-state drive (e.g., NAND flash memory). In addition, the cached or any other stored content may be stored, in whole or in part, on volatile storage, such as dynamic random access memory (DRAM), and this volatile storage may be used in combination with nonvolatile storage, such as in a tiered manner where the most recently accessed content is stored in faster volatile storage before it is transitioned to slower nonvolatile storage.

The proxy 130 may run in a variety of form factors, such as an application, kernel driver, or within the OS on the mobile device, and be configured (for example, via OS network settings) to receive network connections from internal apps 180 and external application servers 250. In one or more embodiments, the proxy server may run in a managed runtime environment such as a JVM 160. The proxy 130 may act as an intermediary on behalf of client applications

180. For example, the proxy 130 may service the request of an app 180 running in another managed runtime environment such as JVM 165.

As one example of operation, the app 180 may request access the Internet using, for example, an Android service such as HttpURLConnection 190. (Here, HTTP stands for hypertext transfer protocol and URL stands for uniform resource locator, e.g., a web address.) HttpURLConnection 190 may then invoke network services 200 provided by the OS to access the Internet. Network services 200 may access the Internet, for example, using access point name (APN) 210 (e.g., a mobile network such as 3G or 4G cellular network) or Wi-Fi connection 220. Network services 200 may be configured to route requests from app 180 to proxy server 130 using a proxy configuration applied globally to the system, or applied to the APN 210 or Wi-Fi connection 220, as shown by dotted lines in FIG. 1. Network services 200 may also route requests from the app 180 to the proxy 130 using a variety of other ways, for example, via network tunnel (TUN) device 230 or IP routing tables (also known as "iptables"), as shown by dashed lines in FIG. 1.

Network services 200 may be configured to specify a proxy directly or indirectly (e.g., as a global system proxy directly detected and used by apps running on the device, or indirectly through a setting on the APN 210 or Wi-Fi connection 220) to access the Internet, such that a request may be sent through a standard communications layer, such as sockets 120 (e.g., a network socket for connecting to the Internet), which is received by the proxy 130. The proxy 130, in turn, may make a request to the app server 250 through the network services 200 (while bypassing the APN or Wi-Fi proxy configuration to avoid looping back to itself) and over an external network 240, where the app server 250 services the request and returns any responding communications to the proxy 130 via the external network 240 and the network services 200. Accordingly, the proxy 130 may then monitor or control the communications between apps 180 and servers 250. The proxy 130 may also cache some, none, or all of the response received from the servers 250 via the caching engine 110 before returning the response through the network socket 120 to the app 180 through the same described stages in reverse (e.g., the APN 210 connection/Wi-Fi 220 connection, the network services 200, and the HttpURLConnection library 190). Instead of using a proxy configuration on the APN or Wi-Fi connection, the network services 200 may also be configured to route requests to proxy server 130 through a variety of other means. For example, another approach is using a network tunnel (TUN) 230 to establish a VPN connection, which may route network activity to VPN service 140 to handle the network transmission. The VPN service 140 may then route the request to the proxy 130 to manage the traffic between the app 180 and app server 250 using the sockets 120 (as appropriate) to service the request and return the response via the network tunnel 230.

Another mechanism for engaging the proxy 130 is to use an interception layer (such as interception layers 150 and 155) within an app to redirect traffic to the proxy process. For example, in the above example, before or in place of having HttpURLConnection 190 invoke network services 200 to access the Internet, HttpURLConnection 190 may have an interception layer 150 intercept the request from app 180 and directly forward its traffic to the proxy 130. Forwarding to the proxy 130 from intercept 150 may be performed through network services 200 or using standard inter-process communications (IPC) mechanism as would be apparent to one of ordinary skill in the art, such as message queues, named pipes, or shared memory.

In addition to the proxy 130 operating in a separate process, such as within JVM 160, in other embodiments, the proxy 130 may be embedded within the requesting process, such as JVM 165 or Browser 185 (such as a web browser). The proxy 130 may then manage the app's network traffic without the need for any inter-process communications.

In another example, the web browser 185 seeks to access the Internet (e.g., external network 240). Similar to the app 180 above, the web browser 185 may take advantage of the proxy 130 by a number of different approaches. For example, the web browser 185 may be configured to access the Internet by using network sockets 125, which could then use network services 200 to access the app server 250 and/or the proxy 130 using, for example, sockets 120 or VPN service 140 as described above. In a similar fashion, interception layer 155 may be added to the web browser 185, which may then intercept the request from the web browser 185 and forward its traffic to the proxy 130.

In further detail, the above techniques may be integrated into existing interfaces, where, in some embodiments, the techniques are differentiated between Secure Sockets Layer (SSL, e.g., encrypted) communications and non-SSL (e.g., unencrypted) communications. Integration with applications may be enabled for non-SSL communications, for instance, in a centralized location in the network stack. For example, proxy 130 may be configured as the proxy for all or a subset of network protocols, such as only for HTTP, HTTPS, or both. Similarly, proxy 130 may be configured as the proxy for all or a subset of network interfaces, such as for cellular, Wi-Fi, or both. For example, for APN 210 access, the cellular access point may be set to the proxy 130. For iptables access, the corresponding Internet Protocol (IP) routing table entries may be set. For VPN service, the VPN client (such as VPN service 140) may route traffic to the proxy 130. For Wi-Fi, the proxy 130 may be set for each Wi-Fi access point (AP). For a global system proxy, the system may direct traffic for all application traffic to the proxy 130.

In addition, integration with applications that use encrypted communications, such as SSL or TLS, may require access to unencrypted network data (e.g., the network data prior to its being encrypted). There are a number of approaches that may be used here. For a man-in-the-middle approach, access to encrypted data may be obtained by impersonating the server via a trusted certificate authority (CA). For a software development kit (SDK) approach (such as with the interception layer 155 in FIG. 1), build-time linking may be used with hooks to the networking API above (e.g., before) the encryption layer. For a relink approach, existing apps may be decompiled and relinked to use custom replacement application programming interfaces (API's), such as with HttpURLConnection 190. For a substitute approach, such as with a browser like web browser 185, an alternative version of the app may be provided where the interception is already wired in. This may be particularly appropriate for widely used open source apps.

Figure 2:
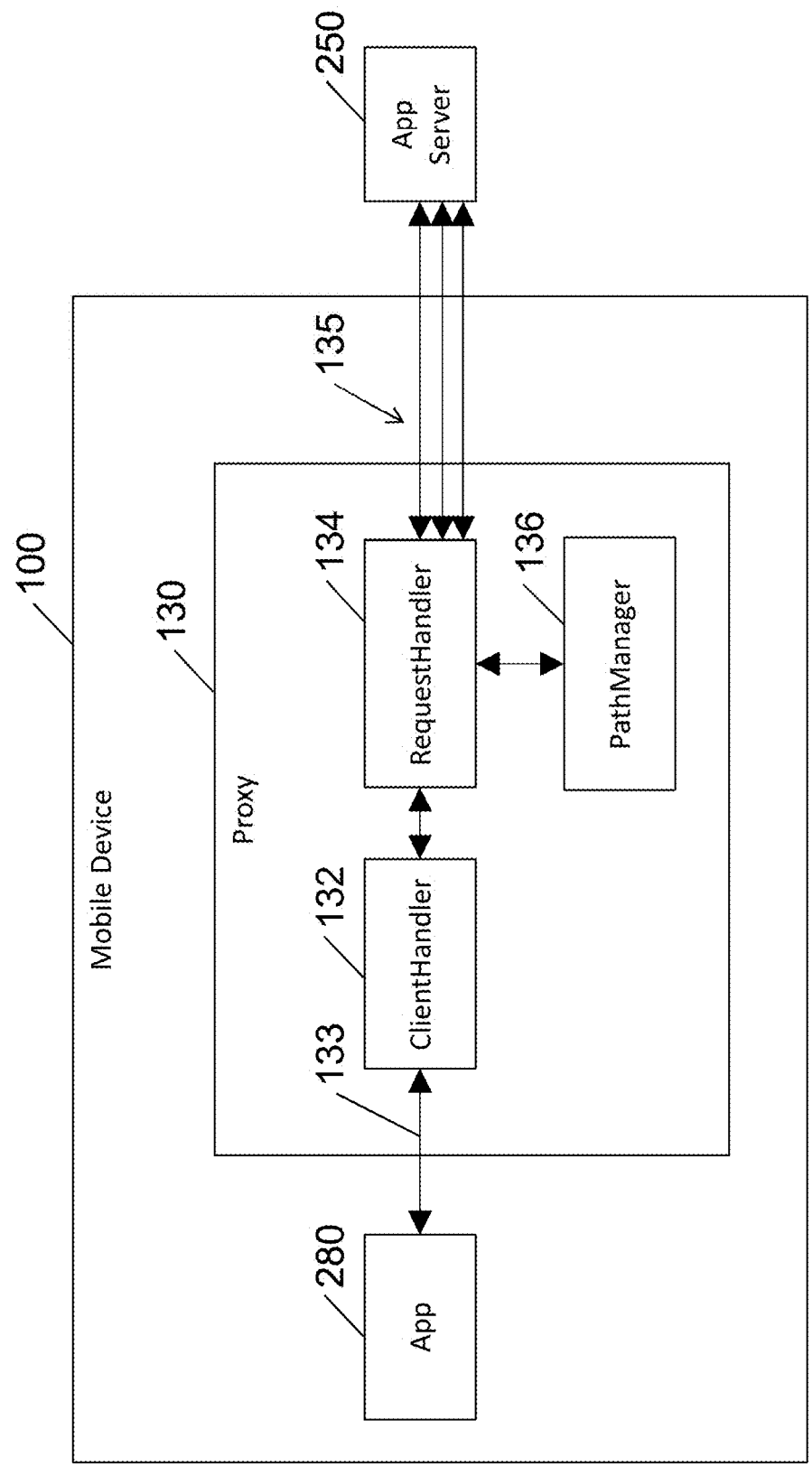
FIG. 2 is a block diagram of the software components within a proxy to enable monitoring and control of network traffic between an app and a server according to embodiments of the present invention.

While FIG. 1 is directed mostly to the architecture of a portable communication device or a mobile device 100, on-device channel bonding may also entail other components, such as software components configured to run on one or more processors of mobile device 100. FIG. 2 is a block diagram of the software components within a proxy 130 to enable monitoring and control of network traffic between an app 280 and a server 250 according to some example embodiments of the present invention.

In FIG. 2, the app 280 running within the mobile device 100 communicates with app server 250, and proxy 130 would intercept the app's network traffic using any of the methods previously discussed, such as through a system proxy setting or VPN. Within proxy 130, in one or more embodiments of the present invention, there are logical software components that perform the network traffic monitoring and control, and these software components may include a ClientHandler 132 that may handle the internal data path 133 (internal to the mobile device 100) with app 280 and a RequestHandler 134 that may handle the external network data path 135 (external to the mobile device 100, e.g., over an external network such as the Internet) with app server 250. FIG. 2 depicts several arrows between the proxy 130 and the app server 250, representing different networks (e.g., different Wi-Fi networks, different cellular networks, and the like) accessible to the portable communication device 100 via different network interfaces of the portable communication device 100.

The data path 133 between app 280 and ClientHandler 132 may take place over different mechanisms, depending on the method used to intercept the app's network traffic, such as a network socket or any other standard inter-process communications mechanism as would be apparent to one of ordinary skill. The data path 135 between RequestHandler 133 and app server 250 may also take place over different mechanisms, depending on how the app 280 would normally communicate with app server 250, such as with a network socket using TCP/IP. By decoupling the internal data path 133 with app 280 and the external data path 135 with app server 250, this allows proxy 130 to separate the network path used by app 280 from the network path(s) used in communicating with app server 250, such as to deliver data to and/or from app 280 (over internal data path 133) while using one or more available network connections to and/or from app server 250 (over external network data paths 135).

According to another embodiment of the present invention, a PathManager 136 may be used to manage the external network data paths 135 used by RequestHandler 133. When there are multiple available networks that can be used, PathManager 136 can implement one or more policies to direct RequestHandler on which network to use for communicating with app server 250. For example, there may be a policy for determining how to handle a slow network (e.g., a congested Wi-Fi network at a busy coffee shop) by directing RequestHandler 133 to distribute (aka load-balance) multiple requests across multiple networks (e.g., across the multiple external network data paths 135). As another example, there may be a policy for determining when to issue a data request redundantly on multiple networks to provide a seamless and responsive data connection even though one of the networks may be unresponsive.

Any of the aforementioned policies may be, for example, provided by the user, pre-configured by the app, or received from an external system, such as a management server. Any of the aforementioned policies may also be extended to have multiple or variable parameters, such as which performance metrics, cost factors, relative weightings of each parameter, etc. For example, a load-balancing policy may consider the network speed/bandwidth, latency and cost per byte, to calculate a policy on how/when to use another network (e.g., cellular) to augment the default, primary network (e.g., Wi-Fi).

Double Tap

Some aspects of embodiments of the present invention relate to selecting from among the available networks or external network data paths 135 by sending the same request for data on more than one of the network connections or network interfaces available to the computing device. Continuing with the example described above, a smartphone may send a redundant or "doubletap" request (e.g., DNS query, or a request for a web page) on both its wireless local area network (or Wi-Fi) connection and its cellular network connection. The term "request" is used generically here to refer to any network request for which there is a corresponding response. To doubletap a request, the request simply needs to be idempotent (e.g., can be safely re-sent on another connection, or can be safely received by an app server 250 multiple times). For example, a request for account status is generally idempotent because no user data is changed at the app server 250 as a result of the request, but a request to charge a credit card would generally not be idempotent because the app server 250 may charge the credit card each time it received that request. This approach can be taken for virtually any type of network traffic, since the initial request of many network protocols is generally idempotent. Examples of such idempotent requests include a Domain Name System (DNS) query, SYN packet for a Transmission Control Protocol (TCP) connection, ClientHello for a Transport Layer Security (TLS) handshake or an HTTP GET request. Examples of requests that are generally not idempotent (or non-idempotent) include HTTP POST.

Embodiments of the present invention may immediately doubletap (e.g., send the same data request redundantly) on one or more other available networks, such as when the cost of the redundant request/response is negligible/small (e.g., a DNS request, where the size of the response is defined, by the protocol, to be small), or it may first send the request on the preferred network (e.g., Wi-Fi) before doubletapping the same request on any of the other available networks (e.g., cellular) after an initial delay, such as if the cost is large (e.g., a request that is expected to generate a response with a large size, such as a file download or a request that consumes significant server resources, such as establishing a TCP connection). Accordingly, the length of the delay may be set based on the known or expected size of the response to the idempotent request (e.g., short delays for small sized responses and longer delays for large sized responses) or based on other cost considerations (e.g., shorter delays for small costs and longer delays for higher costs). The computing device 100 can then detect which connection has better performance (e.g., which of the connections delivers a response first) and continue using the better connection while dropping (e.g., refraining from receiving the response and/or transmitting further requests) the other connection. In the above example, when in an area with a weak Wi-Fi connection and using a doubletap technique according to embodiments of the present invention, the computing device 100 may receive a response via the cellular connection more quickly than through the Wi-Fi connection and may serve the results immediately. In contrast, in comparative, the computing device 100 may attempt the Wi-Fi connection first and only transmit a request along the cellular connection after the Wi-Fi connection has not responded within a brief delay (e.g., a period much shorter than an application-level timeout), herein referred to as the doubletap delay.

The sooner the redundant request is sent, the sooner it can be detected whether one network is more responsive than the other. Typically, when there are multiple networks, there is a preference or priority in determining which one is used. For example, Wi-Fi is typically an unlimited or unmetered network, while cellular can often be a metered or throttled network, so Wi-Fi may be preferred as the "primary" network to use by default, while cellular and possibly other networks may be used secondarily when Wi-Fi is slow or unresponsive. Different networks may have different costs and performance characteristics so there may be different priorities associated with each one, such as preferring cellular over Bluetooth, or only allowing cellular as a secondary network when it has an unlimited data plan. In other words, the order of preference for the available networks can be determined based on one or more characteristics of the network, such as performance or cost. In some embodiments of the present invention, the order of preference for the available networks is set through configuration data provided by a user. Embodiments of the present invention can leverage a combination of secondary networks in different orders of preference to use for redundant requests.

For example, when an application requests data from a server, it may send a DNS request for the IP address associated with the app server's domain name, followed by a TCP SYN packet to establish a connection with the app server, possibly followed by a TLS ClientHello (e.g., if for an HTTPS request) and finally, it sends an HTTP GET to request the data. Each of these are requests is idempotent and can be issued redundantly on the secondary network to provide resiliency against any problems with the primary network. However, each of these requests has different costs and impacts to the network and/or server. For example, DNS requests/responses are small and stateless, so they can be sent redundantly on multiple networks without incurring significant cost or overhead on the network or the DNS servers. However, a TCP connection is a more limited resource (e.g., servers have a limit on concurrent connections), so, in some embodiments, the Proxy 130 delays the redundant request for a TCP connection to the server (e.g., sending a SYN packet) on the secondary network until it detects that it has not received a response from the app server 250 (e.g., receiving SYN-ACK) within the typical time via the primary network (e.g., the typical time may often be within 1-2 seconds). As noted above, this waiting period may be referred to herein as a doubletap delay (e.g., a period slightly longer than the typical time for a response, e.g., 2 seconds).

In general, when delaying the redundant doubletap request on the secondary network(s), the request on the primary network is effectively given a small head start and it will complete successfully most of the time (e.g., a response will usually be received via the primary network within the doubletap delay, without the need to send a SYN request to the server on the secondary network). But after the doubletap delay, the redundant request is sent on the secondary network(s), so it would race against the request that was sent on the primary network. Any network for which a response is seen can be used to receive the response, and it is possible that the response is received via more than one network. To reduce or minimize network traffic that would the duplicative, in some embodiments the Proxy 130 selects just one (e.g., exactly one) network from which to receive the response. In one embodiment of the present invention, the network from which the Proxy 130 received the response first is selected as the doubletap "winner," and the Proxy 130 terminates the data request on the other network or networks (e.g., by closing the other connection or connections). Terminating the doubletap "loser" or "losers" prevents further processing and network usage (e.g., bandwidth consumption) for handling the redundant response, and how a redundant request is terminated varies based on the type of request. For example, DNS is stateless so it is sufficient to simply ignore any redundant "loser" responses, while an HTTP request can be terminated by closing the redundant connection on the network that lost the doubletap race.

There are many examples of protocols that can be "doubletapped" as described herein, such as previously described for the DNS and TCP protocols, and it should be apparent to someone of ordinary skill in the art to see that other protocols can similarly leverage this doubletap approach to provide redundancy. For example, a TLS session is commonly established over a TCP connection and the TLS ClientHello request can be doubletapped on the secondary network, preferably also after a delay during which the Proxy 130 does not receive a TLS ServerHello response from the app server 250 on the primary network within the typical response time (e.g., also typically within 1-2 seconds). Another example is QUIC (Quick UDP Internet Connection), which establishes a logical secure connection using UDP instead of TCP and leverages the same TLS handshake, so its idempotent requests can be sent redundantly using the doubletap technique (e.g., send the same ClientHello redundantly on the secondary network, possibly after a delay). As another example, an HTTP request is commonly performed after establishing a TCP or QUIC connection, and any idempotent HTTP request (e.g., HTTP requests where the method is GET, HEAD, PUT, or DELETE) can be sent redundantly on the secondary network(s), also preferably with a delay after initially sending on the primary network. As described in these examples, doubletap can be applied to different protocol layers, such as those defined by the OSI network protocol model, and doubletap can even be performed in more than one protocol layer for the same application-level data request. Performing the doubletap at multiple protocol layers provides multiple points of redundancy, where a failure (e.g., due to a bad network signal) can occur at any of these multiple points in the client-server interaction and recovered on a secondary network.

Because the redundant request on the secondary network is delayed only by the typical response time seen for most responses (e.g., the doubletap delay time), in some embodiments of the present invention, these doubletap delays are much shorter thresholds than would typically be set for application timeouts, such as those that result in errors when exceeded (e.g., timeouts that are set based on the maximum or worst-case response time). Using short delays (e.g., a few seconds) for issuing redundant requests allows these redundant requests to provide responses from the secondary network when the primary network is bad/unresponsive without exceeding the timeouts in the application that are used to detect network problems. In some instances, this can prevent an application timeout message from being displayed to a user (because a response is received from the secondary network). In contrast, in comparative systems, a user might need to wait a long time until a timeout error occurred at the application level (e.g., tens of seconds) and it would often be unclear to the user what is the cause of the problem (e.g. an unresponsive Wi-Fi network is often indistinguishable from an unresponsive server, unless communications with that server was also attempted on another network). An embodiment of the present invention is to configure an appropriate doubletap delay for each of the possible requests that may be sent redundantly on the secondary network, such that each delay allows for most responses of a given type of request to be received within that timeframe whenever the primary network is good or responsive or healthy.

Figure 3:
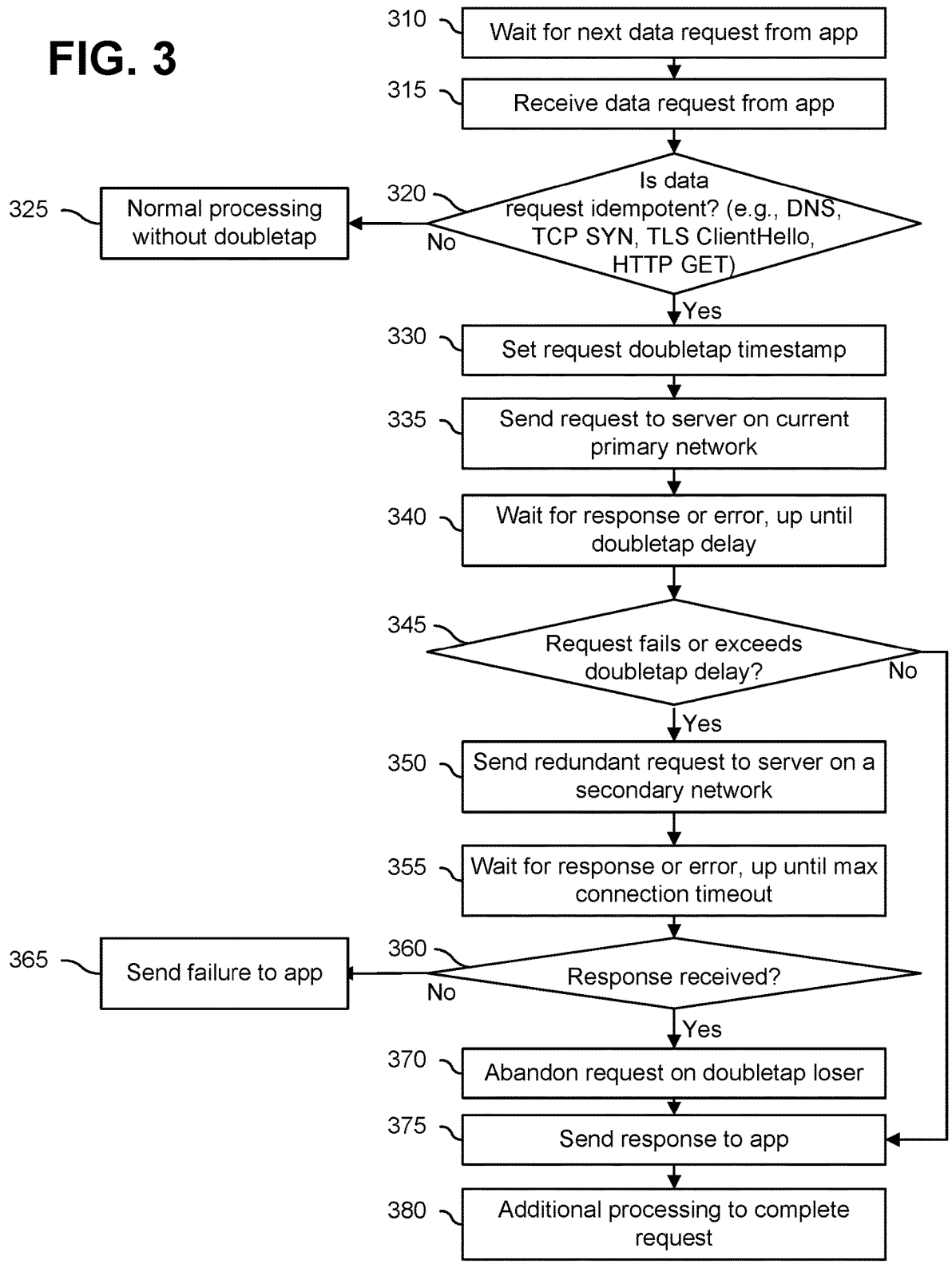
FIG. 3 is a high level flowchart diagram illustrating a method for setting a primary network according to one embodiment of the present invention.

FIG. 3 is a high level flowchart diagram illustrating an example method of the doubletap approach according to one embodiment of the present invention. This flowchart can be performed by an intermediary in the network data path, such as described in FIG. 1 by proxy 130 between app 280 and app server 250. The proxy 130 may be waiting at step 310 for data requests to be sent from an app to a server. When a data request is received from an app at step 315, the proxy determines at step 320 whether the request is idempotent, to determine whether it can apply the doubletap approach. If no, then the normal network processing by a proxy is applied at step 325 without performing the doubletap. If yes, then the proxy 130 will apply the doubletap, first by saving the current timestamp at step 330 as the beginning of the doubletap delay, if applicable (e.g., based on the type of request, and possibly other factors discussed previously). The data request is then sent to the server at step 335 on the current primary network. The proxy 130 waits at step 340 for the response to be received from the server (e.g., if the network is good/responsive), up to the doubletap delay. If the proxy determines at step 345 that the doubletap delay was exceeded, then the proxy 130 proceeds to step 350 to send the request redundantly on one or more of the available secondary networks. If, in step 345, the proxy 130 determines that the response was received successfully within the doubletap delay, then the proxy 130 proceeds to step 375 to complete the response by sending the response to the app 280.

If a redundant request was sent at step 350, then the proxy 130 waits for the response to be received on any of the networks that the request was sent redundantly on. At step 360, if the proxy 130 determines that a response was never received via any network (e.g., within a timeout period), then the proxy 130 fails the request back to the app at step 365 (e.g., sends a failure, such as an error response or connection reset, to the app 280). However, if the first response is received (e.g., within the timeout period), then this first response is the "winner" of the doubletap race and the proxy 130 can abandon the request on the other "losing" networks at step 370 (e.g., either explicitly by closing their sockets, or implicitly by simply ignoring later responses). Now that the proxy 130 has a successful response, it can send that response from the doubletap winner to the app 280 at step 375. Depending on the protocol and the state of the connection with the app, there may be additional processing at step 380 to be performed to complete the logical request. For example, a TLS handshake begins with a ClientHello but may take additional request/response round-trips with the server to complete the process. Conversely, a DNS query or TCP connection would be completed by a single response from the server and would not need to have additional processing at step 380.

When the primary network has been determined to be problematic (e.g., slow or not fully unresponsive), it may be desirable to preemptively switch to a different network as the primary network before the current primary network has explicitly failed (e.g., timed out, disconnected), since the delays on the current primary network can often continue beyond the current request/connection, such as when the user is at the edge of the optimal range of a Wi-Fi network (aka a "dead zone"). Continuing to process network data using the problematic primary network by default may still work but can result in the user experiencing slower overall network performance than normal, since the redundant data requests sent on the secondary network(s) may be delayed to minimize duplicative network traffic. Switching to another, perhaps more responsive, network as our primary network for processing the network traffic means that requests are sent on that network first by default without any delay, thus allowing the user to experience the full performance of that more responsive network. Different policies are possible when deciding how and when to change the primary network, such as by exceeding a threshold of consecutive doubletap winners, or exceeding a maximum threshold for the response time of one or more responses. The threshold used for these policies can be configured manually or dynamically set by heuristics/machine learning based on prior results seen for a particular network (e.g., it may be normal for some Wi-Fi networks to respond to DNS more slowly than others) or for a particular server (e.g., it may be normal for some servers to respond to TCP SYN or TLS ClientHello requests slower than others).

Another way to improve performance when the primary network is problematic (or diminished or degraded) is to leverage other signals to either determine how much to delay the redundant requests to the secondary network(s) or preemptively switch to another network as the primary network. For example, if the device 100 (e.g., the operating system) provides access to information about network quality (e.g., signal strength, rate of packet failure, (e.g., lost/bad packets), and the like), then these can be used to decide how and when to use the secondary networks. For example, if the primary network is Wi-Fi and its signal quality (e.g., Received Signal Strength Indicator aka RSSI) falls below a particular threshold, then the doubletap delay for the redundant requests can be reduced, possibly to none, to allow the secondary network to handle requests sooner and reduce or minimize any user-visible delays due to waiting for a timeout on a degraded network connection. This approach can be gradual or tiered, such that different delays can be configured for different signal quality levels (e.g., doubletap delay goes down as the signal quality gets worse). As the signal quality continues to fall and/or degrade, it can also be used to switch to a new primary network when the previous primary network's signal quality level falls below a worst-case level. Any quality level or indicator available for the network can be used, in any combination, to apply the aforementioned approach to reduce the doubletap delay or switch to a new primary network. In some embodiments, the signal strength of the current primary network (i.e. prior to switching to another network as the new primary network) may still be within an operable range, although the performance may be degraded. For example, the signal strength may be degraded to a point where the maximum bandwidth of the current primary network is reduced, but the connection is still usable (e.g., partial packet loss).

Figure 4:
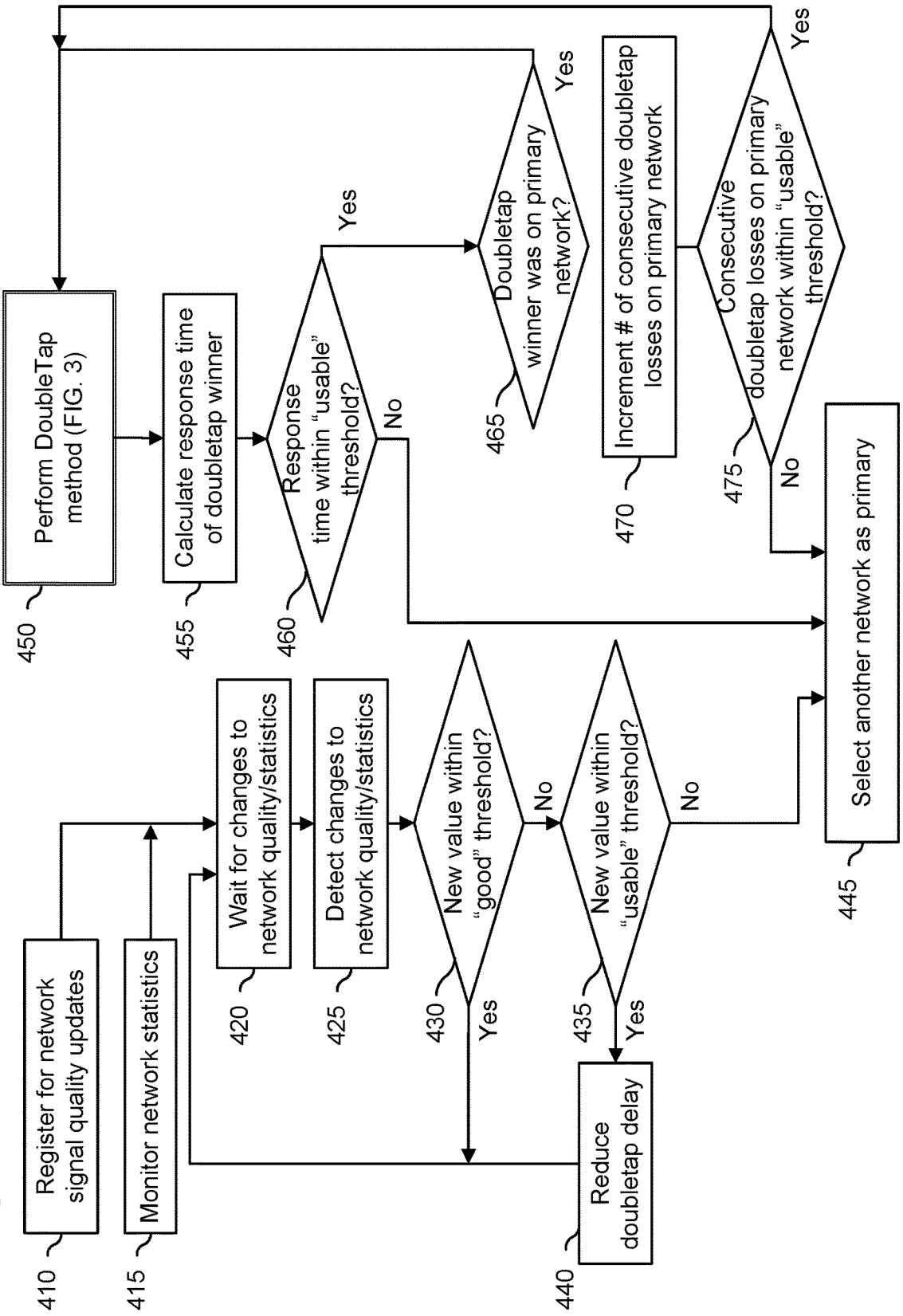
FIG. 4 is a high level flowchart diagram illustrating a method for leveraging advance signals to control network access according to one embodiment of the present invention.

FIG. 4 is a high level flowchart diagram illustrating a method of leveraging advance signals to control network access according to one embodiment of the present invention. The term "advance signals" may be used herein to refer to early warning signs detected from monitoring network behavior (e.g., before the current primary network has explicitly failed or timed out). In some embodiments, detection of the advance signals is used to adjust the doubletap delay and/or preemptively switch the primary/default network. Referring to FIG. 4, according to one embodiment, in step 410, the proxy 130 registers for signal strength updates (e.g. RSSI) or similar network quality data from the operating system (this step may be omitted in embodiments where network quality data is not available, such as when the operating system doesn't support it or it's not available for the current primary network). In step 415, the proxy 130 may also begin monitoring network metrics, such as packet statistics (e.g., counts and/or rates of dropped packets or retransmitted packets detected on the network). In step 420, the proxy 130 waits for changes or updates to the subscribed network signal quality data and/or network statistics data. If a change is detected (e.g., operating system sends a notification via a callback or equivalent, if supported, and/or a thread or equivalent periodically samples and monitors for changes in network data), then in step 425, the proxy 130 receives the updated network data (e.g. RSSI data and/or network statistics data).

In step 430, the proxy 130 determines whether the received new value (e.g., of the RSSI data or the network statistics data) is "below" (or otherwise better than) a given threshold indicating a "good" network. If so, then the proxy returns to step 420 to wait for more data. For example, if the packet loss rate is below a "good" threshold, then no change is needed and the proxy 130 returns to step 420. The term "below" (or "<" in FIG. 4) does not necessarily refer to numerical values, but rather refers to whether the value is within a range of "good" performance. For example, an RSSI value is better when the signal strength is higher, so a high signal strength would satisfy being within the condition of a "good" threshold as shown in FIG. 4. Conversely, packet loss is better when it is lower, so a low value (or rate of change in this value) would satisfy being within the condition of a "good threshold".

If the new value is not within the "good" threshold or range, then the proxy 130 proceeds to determine in step 435 if the new value is within a "usable" range (because the proxy 130 reached step 435, the new value is outside the "good" range). If so, then in step 440, the proxy 130 reduces the doubletap delay discussed above. This is because the current network appears to be unreliable, and therefore requests should be sent on alternative networks sooner than later. After reducing the doubletap delay in step 440, the proxy returns to wait for the next network status update in step 420.

If the proxy 130 determines in step 435 that the new value is not within the "usable" range, then in step 445 the proxy 130 sets another network of the networks available to the portable communications device 100 as the primary network. The selection of another network may be done based on a preference ranking among the other networks (e.g., a highest ranked network), as described above.

Some aspects of embodiments of the present invention relate to selecting another network to be the primary network based on the response time of the doubletap request as discussed above with respect to FIG. 3. Still referring to FIG. 4, in some embodiments of the present invention, after the proxy 130 performs, in step 450, a doubletap via a current primary network, the proxy 130 then calculates the response time of the doubletap winner at step 455 (e.g., the difference between a timestamp of a request and a timestamp of a corresponding response from the network). In step 460, the proxy 130 determines whether the response time exceeded a "usuable" threshold, such as a time threshold that is low enough to avoid failures/timeouts detected by app 280 but high enough to indicate the network is not sufficiently responsive to be preferred as the default network for future requests (e.g. 2-4 seconds). If so, then the proxy 130 selects a new primary network in step 445, as discussed above.

If the response time of the doubletap winner is within the maximum "usable" time threshold allowed for the primary network, then proxy 130 checks at step 465 whether the primary network was the doubletap winner. If yes, then the primary network is confirmed to be sufficiently responsive and proxy 130 continues to use it by default for requests at step 450. However, if the doubletap winner was a secondary network, then we increment at step 470 the number of consecutive doubletap losses observed for the primary network. Next, at step 475, proxy 130 checks whether the number of consecutive doubletap losses by the primary network exceeds a "usable" threshold indicating that the primary network is sufficiently degraded or unresponsive (e.g. 2-4 consecutive losses). If no, then the primary network may still be sufficiently response and proxy 130 continues to use it by default for requests at step 450. If not, then proxy 130 selects a new primary network in step 445, as discussed above.

When switching to another network to use by default as the primary network, this generally means the preferred network (e.g., Wi-Fi) is problematic (e.g., unresponsive or too slow) and it is better to use another, less preferred network (e.g., cellular). It may then be possible later for the more preferred network to become responsive enough again, such as if the user moves back closer to where the Wi-Fi signal quality is good again. The doubletap approach can be used to determine that a better network is available to use as the primary network than the current one, such as by continuing to allow doubletap requests to race across the available networks, leverage network quality indicators, or a combination thereof. Performing the doubletap even after switching to a new primary network allows us to see the responsiveness of the previous primary network, and to monitor for a change in the conditions that initially triggered the switch. For example, if the primary network is switched to cellular due to exceeding consecutive doubletap loses, the proxy 130 can simply continue sending redundant requests to Wi-Fi, and if the proxy 130 detects consecutive doubletap winners on Wi-Fi, the proxy 130 can then switch back to Wi-Fi as the primary network.

In some embodiments, the preference ranking among available networks is determined based on a combination of factors, such as cost, performance, business relationship, etc. These factors can be variable, such as network performance (e.g., temporary congestion) or network traffic cost (e.g., higher during peak periods), so the preference ranking may change dynamically. Embodiments of the present invention can leverage any combination of static or dynamic factors to consider which network to prefer at any time. For example, to consider performance as a factor, the throughput of the available networks can be monitored. Since the system (e.g. proxy 130) is handling the network traffic, an embodiment of the present invention can then actively measure the current network bandwidth or latency of the traffic flowing through the system (e.g., current rate, peak rate within recent time period), and then adjust the preference ranking accordingly (e.g., a Wi-Fi network that is significantly slower than the cellular network can reduce its relative ranking, possibly such that the cellular may be considered more preferred). As another example, to consider cost as a factor, the system may query for the current cost for using a particular network. An embodiment of the present invention may make an application programming interface (API) call to the network or some backend management and/or pricing system to query for the current cost of using an available network (e.g., current Wi-Fi or cellular network), and then adjust the preference ranking accordingly. For example, these costs can sometimes be dynamic, such as when a user is roaming onto $3^{rd}$-party cellular network, attempting to access a Wi-Fi network that charges for access, or possibly varying based on current on-demand/spot pricing that increases based on congestion. In some aspects of embodiments of the present invention, an entity such as a user, mobile network operator, or device manufacturer can supply a particular ranking (e.g., pin particular networks higher in the preference ranking) or may configure the weights of particular factors used in combining the preference ranking of the networks.

The aforementioned embodiments of the present invention may rely on network traffic to trigger their respective action, such as switching to a different primary network or re-ranking (or rearranging) the preference of the available networks. In some cases, there may not be sufficient network traffic to trigger a desired action, such as when there is only a single long-lived encrypted connection receiving data from the server without any new data requests that can be doubletapped. In one embodiment of the present invention, the proxy 130 generates its own doubletapped requests to generate a minimum level of activity to help trigger detection of an unresponsive primary network. For example, one approach is to monitor for a minimum time threshold (e.g., a few seconds) since the last DNS request received from the inside that was doubletapped, and if that was exceeded, then the proxy 130 performs a doubletap of a test DNS request (e.g., for a well-known hostname) that helps detect an unresponsive primary network within that minimum time threshold. It should be apparent to someone of ordinary skill that any data request that can be doubletapped can then be used, such as a TCP connection request (e.g., SYN). Similarly, these simple and lightweight doubletap tests can then be used to trigger other necessary actions, such as re-ranking of the preferred order of the available networks.

Load Balancing

Some aspects of embodiments of the present invention relate to enhancing the performance of slow connections on a network (e.g., a slow Wi-Fi connection) with another connection on another network (e.g., a cellular connection). In various embodiments of the present invention, the load balancing technique distributes load across one or more available networks to increase overall network performance (e.g., increase bandwidth, reduce latency). Some embodiments of the present invention may measure the performances of the different network connections (similar to the doubletap technique described above) and select the network connection or a combination of network connections having higher throughput or less congestion. This approach allows multiple requests or connections to be distributed across the available networks based upon their performance, such as distributing based upon the maximum achievable throughput of each network, the number of outstanding requests/connections of each network, or a combination thereof. In other embodiments of the present invention, all of the network connections (e.g., both Wi-Fi and cellular connections) may be used concurrently to download different portions of the data, where the data received along the different connections is recombined at the device.

Embodiments of the present invention are directed towards detecting when to distribute network traffic to a secondary, less preferred network when the primary, more preferred network is busy or slow. Generally, it is desirable to use the preferred network when it is fast and has sufficient capacity, and only use other, less preferred networks when the preferred network's capacity has been reached. However, this can be difficult to determine accurately unless there is enough data being transferred to completely saturate the network connection. Also, when the network is shared with other users, which is common for both Wi-Fi and cellular networks, the capacity used by other users will reduce the peak capacity that can be measured. As such, some embodiments relate to determining that the preferred network's capacity has been reached without the generation of test traffic and works independently of the network load generated by other users on that network. An embodiment of the present invention is to track the currently active requests on the preferred network and distribute requests to other, less preferred networks when that threshold has been reached. The notion of an active request here is any logical request/response pair, and this can apply to both cleartext traffic (e.g., an HTTP GET) as well as to encrypted traffic (e.g., receiving encrypted data in response to sending outbound encrypted data). In the case of cleartext traffic, determining a request is no longer active can be based upon receiving the complete response data (e.g., an HTTP response can specify a content-length header or an end of data marker for chunked transfers). For encrypted traffic, it may not be possible to identify an explicit end of a response, so in some embodiments, a request is treated as being complete upon receipt of the initial data response (e.g., most responses from the server are small and complete within a few seconds). Alternatively, there are other signals that can be leveraged to identify the end of an encrypted data request, such as when the time since receiving the last encrypted data chunk exceeds the typical minimum time between data chunks from the server (e.g., 2-3 seconds). This approach of tracking active requests has the advantage of only considering connections that have actual requests being actively processed, and avoids considering long-lived connections that remain but are inactive (e.g., pooling unused connections). This approach can also handle pipelined requests going over a single connection, since each new pipelined request is sent out as a consecutive sequence of outbound data to the server, and each of these can increment the active request count until a corresponding sequence of inbound data from the server is received to decrement the active request count.

With a count of "active requests", the proxy 130 can then shift new requests to another, less preferred network (e.g., cellular) whenever a threshold for the primary, preferred network (e.g., Wi-Fi) is exceeded. This threshold (e.g., minimum threshold) controls the selection of networks such that the primary network is tried first for new requests, and if these active requests are completed (e.g., responded to) quickly without exceeding this threshold, then the proxy 130 uses the primary network to service the bulk of the network traffic. Whenever this threshold is reached, then a proxy 130, according to embodiments of the present invention, directs new requests to another network and correspondingly tracks the number of active requests for that other network to establish a balanced distribution of load among the available networks.

Another embodiment of the present invention is to use the number of active requests to establish a ratio of requests to distribute to each network. With a relative ratio of active requests between the available networks, the system can maintain a distribution of active requests among multiple networks to balance (e.g., for optimal performance) the network load across those networks. For example, a slower network may have requests that remain active for a longer timeframe than requests sent to the faster network, so this approach provides a way to distribute traffic among multiple networks without using test traffic to determine the capacity of each of the networks. In various embodiments of the present invention, the ratio of active requests to maintain between each of the available networks is configured statically, computed dynamically, or a combination thereof. In some embodiments, the active requests ratio is combined with the minimum threshold for the primary network, such that the ratio is used to distribute new requests among the networks when the minimum threshold is currently exceeded.

Figure 5:
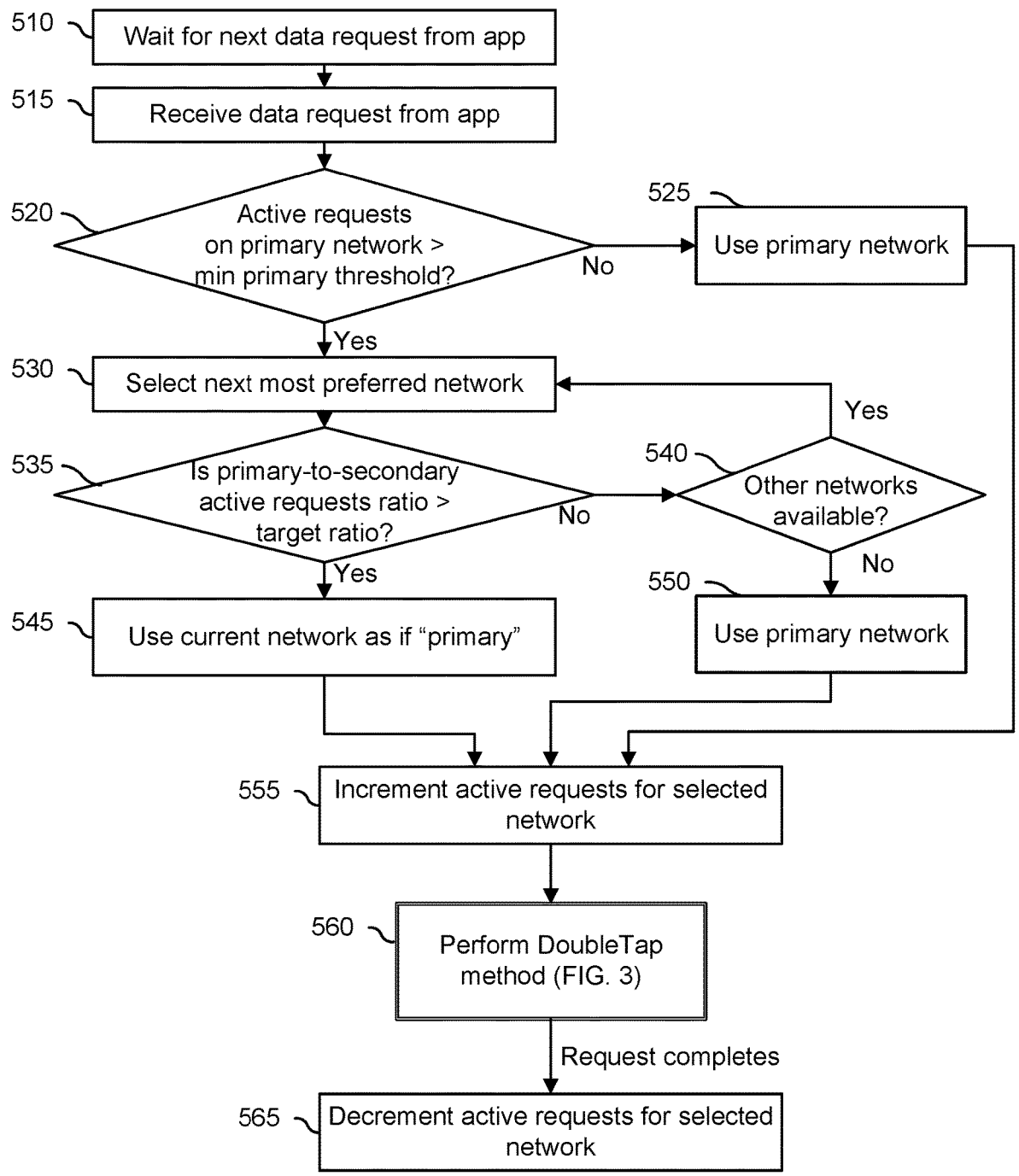
FIG. 5 is a high level flowchart diagram illustrating an example method of the load-balancing approach according to one embodiment of the present invention.

FIG. 5 is a high level flowchart diagram illustrating an example method of the load-balancing approach. This flowchart can be performed by an intermediary in the network data path, such as by proxy 130 between app 280 and app server 250 described in FIG. 1. According to one embodiment of the present invention, the proxy 130 waits at step 410 for data requests to be sent from an app 280 to an app server 250. When a data request is received from an app at step 55, the proxy 130 determines at step 520 whether the primary network has exceeded its minimum threshold of active requests. If no, then the primary network is selected at step 525 for the new request and then proceeds to step 555. If yes, then the proxy 130 iterates through each of the secondary networks, such as in order of preference, to identify or select a network to use by checking its ratio of active requests relative to the primary network. If the active requests ratio of the primary network relative to the current secondary network at step 535 is greater the target ratio, then the proxy 130 selects the current secondary network at step 545 to use for this request as if it were the primary and then the proxy 130 proceeds to step 555. Otherwise, if the active requests ratio between the primary and current secondary network is less than the target ratio, then the proxy 130 continues to the next secondary network at step 530. If there are no other secondary networks at step 540, then the primary network is selected at step 550 and proceeds to step 555. At step 555, a network has been selected for the request so the active request count for the network is incremented. In one embodiment of the present invention, the load-balancing approach is combined with the doubletap approach at step 560, where the request is then processed according to the flowchart of FIG. 3 to provide redundancy against the selected network being unresponsive. When the request is completed (e.g., when a response is received from the selected network), the number of active requests for the selected network is decremented.

Some aspects of embodiments of the present invention relate to measuring the speed/bandwidth of each network without using test traffic by monitoring the bandwidth used by the network activity currently flowing through the system (e.g., average and peak speeds). This approach allows the system (e.g., the proxy 130) to also use these bandwidth measurements of each network to calculate an appropriate ratio of active requests among these available networks, and then to distribute new requests to each network to maintain this ratio. For example, Table 1, above, shows how overall performance can be increased by distributing the load across multiple networks based on the relative speed of each one. Because networks are generally shared by multiple mobile devices among multiple users (e.g., cellular and Wi-Fi), the performance of these shared networks can vary over time (e.g., due to contention between the users). As such, these bandwidth measurements can be used to dynamically monitor and update the active requests ratio between the available networks.

Some aspects of embodiments of the present invention relate to tracking the maximum bandwidth seen for each network (e.g., specific Wi-Fi SSID and BSSID, or a specific cell tower) as a possible bandwidth ceiling for each network, which can be used for calculating the active request ratio. For example, if the number of active requests is increasing for a network but the measured bandwidth is not increasing, then the currently measured bandwidth may be a possible current ceiling for the network. Also, some aspects of embodiments of the present invention relate to using a minimum or threshold amount of data transferred during the timeframe of the bandwidth measurement to increase the confidence that the measured bandwidth is a possible ceiling and to avoid false positives. In some embodiments of the present invention, the proxy 130 calculates a confidence level (or confidence score) in the current bandwidth, such as based on the proximity of the current measurement to previous measurements and/or based on how much data was transferred during the timeframe of the current measurement. Having a confidence level allows the system to determine whether the currently measured bandwidth should be used to update the active requests ratio, such as by establishing a minimum confidence level required to update the ratio. Then, when selecting a network for a data request, the proxy 130 also determines whether a currently selected network is at its bandwidth ceiling and choose another network that is below its bandwidth ceiling, possibly doing so in spite of (e.g., overruling) the active requests ratio.

Tracking the active requests for each network can also be used to dynamically detect changes in the capacity of a network. Some aspects of embodiments of the present invention relate to monitoring how long requests remain active for each network and adjusting the active requests threshold of each network to allow each network to be able to complete the active requests (e.g., decrement the number of active requests) in a similar amount of time. For example, if one network is found to be completing active requests twice as fast (e.g., 2 times faster) than another network, then the ratio of active requests can be adjusted to send twice as many (e.g., 2 times more) new requests to the faster network than the slower one. The request completion time for each network may change over time (e.g., due to activity by other users on the shared network increasing or decreasing over time), so this can be used to dynamically adjust the active requests ratio between the available networks. In some embodiments, this approach is applied in circumstances where there is insufficient network activity to determine the peak capacity or speed of the available networks (e.g., without needing to use test traffic to determine that peak capacity). This approach can also be combined with the previously discussed approach of using speed measurements of each network to calculate an appropriate ratio, such as by assigning a weighting to each approach and calculating a ratio of active requests based on the combined weighting. In some embodiments, the relative weighting of each approach is adjusted based on their respective confidence. For example, the currently measured speed of a network is more accurate when the amount of data transferred is high, while measuring the active time of requests is more accurate when the amount of data transferred is low, so the weighting of each can be adjust dynamically based on these factors (e.g., bytes transferred per request).

Some embodiments of the above approach use response time or latency to calculate a ratio of requests to send to each network, such as by measuring the time from sending the request to receiving the first byte of response (e.g., time to first byte without waiting for the active request to fully complete). This approach can also be combined in a similar manner (e.g. calculate a combined weighted) with the aforementioned approaches of factoring in speed measurements and active time per request. It should be apparent to someone of ordinary skill in the art that a variety of different performance metrics can be leveraged to determine an optimal ratio of active requests to distribute to each available network.

Each of the aforementioned thresholds or ratios can also be adjusted on a per network basis (e.g., track separate values based on historical results seen for each distinct Wi-Fi SSID), such that the system learns thresholds (e.g., the best thresholds) to use for each network. This allows the system to establish operating settings (e.g., the optimal operating settings) for a network without having to start from scratch every time that network is joined. The various measurements and calculated ratios discussed previously can be stored for each network (e.g., in accordance with the Wi-Fi SSID of the network) and restored whenever rejoining that specific network, then continuously updated over time.

Wi-Fi Connection Management

Some aspects of embodiments of the present invention relate to automating the Wi-Fi connection process, such as checking for other Wi-Fi networks with better signal quality and either generating notifications when the device is within range of a "good" Wi-Fi connection or pre-emptively detaching from the currently connected Wi-Fi network to force the device to join the better Wi-Fi network. Some aspects of embodiments of the present invention relate to automating the process of logging in to captive portals (e.g., Wi-Fi connections provided by businesses but subject to log-in, password, or payment requirements).

One aspect of embodiments of the present invention relates to leveraging the portable communication device's 100 scanning of available networks (e.g., Wi-Fi rescans) to connect to different networks to improve performance. These rescans occur regularly in most operating systems, such as when a user moves, when the RSSI of the current network changes, or when the user views the list of available networks. For example, when doubletap, described above with respect to, for example, FIG. 3, triggers a primary network switch (e.g., when in the dead zone of the Wi-Fi network), it can be beneficial to check for a different network of the preferred type (e.g., another Wi-Fi network with a better RSSI), since the current network has been deemed to be slow or unresponsive. Another example would be when the load-balancing determines that the active requests are finishing too slowly (e.g., average or worse case times are below some minimum threshold).

Regardless of the trigger, any detected degradation of a currently connected network can be used to trigger switching to another network of the same type. In other words, the earlier discussion about the doubletap approach was to switch from one network type (e.g., Wi-Fi) to another network type (e.g., for a single request or to use as the default/primary for all requests), but this can be further generalized to switch between different networks of the same type. For example, this would be helpful for switching to another Wi-Fi network (e.g., having a different SSID, or same SSID but different BSSID), since devices generally do not switch to another Wi-Fi network until the current one is unusable because they typically only detect problems using timeouts that are set high enough that there is certainty of a problem. However, as discussed above, these timeouts are generally too high and thus too slow to seamlessly move users to a better network (e.g., the app may hang for a long time and/or the user may see an error message before the device switches to a better network). With the doubletap approach, for example, the system can make a faster decision to change to another network of the preferred type (e.g., disconnect from the current Wi-Fi network and join another Wi-Fi network) well before a user sees a timeout failure, enabling a faster, more seamless transition while maximizing the quality/availability of the preferred network type. Also, the handoff between different unrelated Wi-Fi networks can be slow, since the portable communication device 100 may need to perform a long multi-step process to join and authenticate to the Wi-Fi network, so the doubletap approach can ensure a more seamless Wi-Fi network to Wi-Fi network transition by using cellular during this transition as previously discussed.

Figure 6:
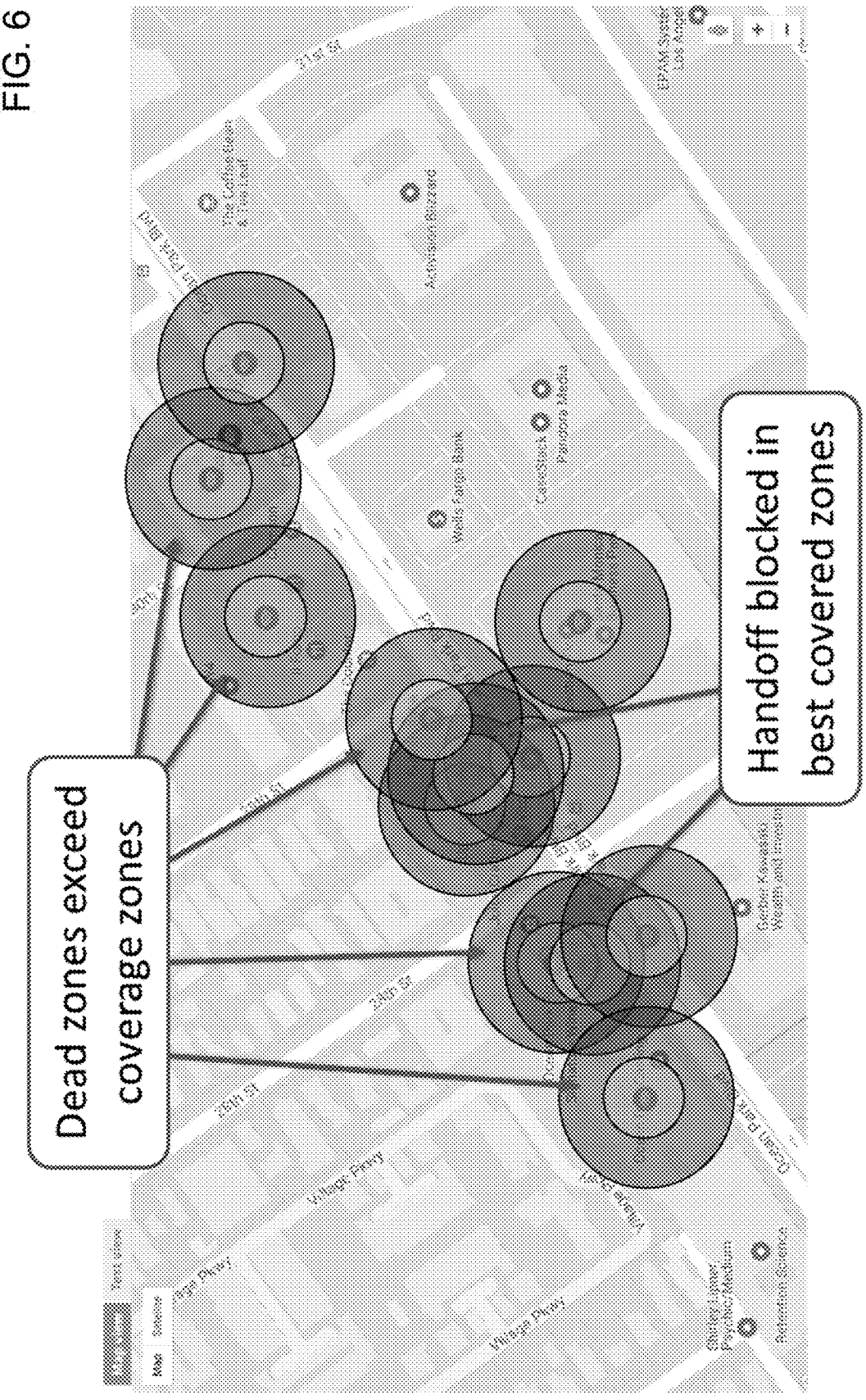
FIG. 6 shows an example of a neighborhood with multiple Wi-Fi networks where each one has inner green circular region indicating the area of good signal quality and an outer red circular region indicating the area of bad signal quality (i.e. the Wi-Fi dead zone).

FIG. 6 shows an example of a neighborhood with multiple Wi-Fi networks where each one has inner circular region indicating the area of good signal quality and an outer circular region indicating the area of bad signal quality (e.g., the Wi-Fi dead zone). For example, when the outer zone of one Wi-Fi network (e.g., Wi-Fi network "A") overlaps with the inner zone of another Wi-Fi network (e.g., Wi-Fi network "B"), then that can result in Wi-Fi network A preventing the use of Wi-Fi network B, such as when a mobile device first attaches to Wi-Fi network A but then stays attached to it even though Wi-Fi network B may offer a better network connection.

Figure 7:
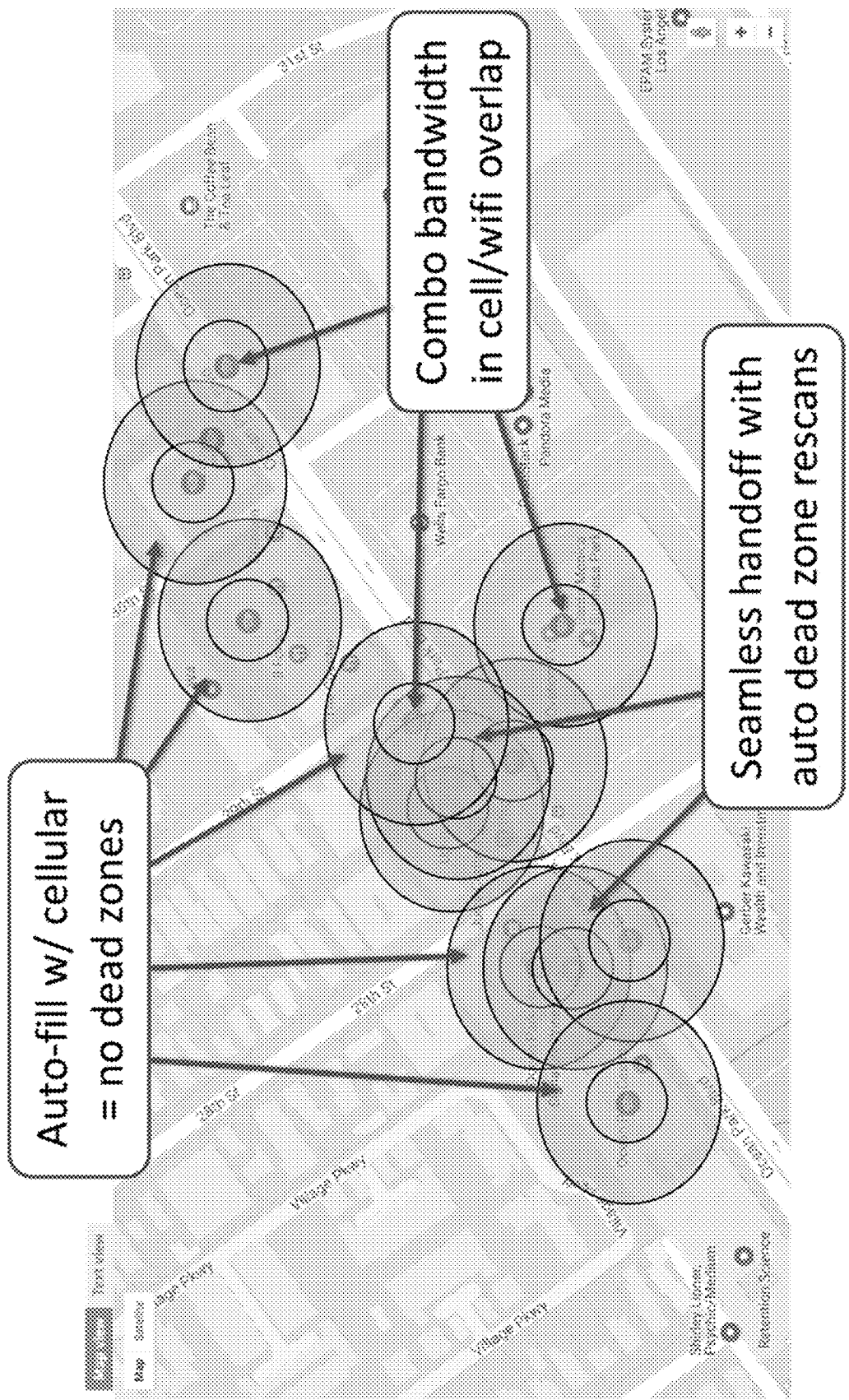
FIG. 7 shows the same example as FIG. 6 but leveraging the techniques according to embodiments of the present invention.

FIG. 7 shows the same example as FIG. 6 but leveraging the techniques according to embodiments of the present invention. With the doubletap technique, when the mobile device 100 is in the outer unusable zones of each Wi-Fi network, it can leverage a cellular network to automatically fill in network connectivity while in the dead zone of an associated Wi-Fi network. With the load-balancing technique, the inner usable zones of each Wi-Fi can leverage the cellular network to combine the bandwidth of both to increase overall performance. With the connection management technique, the mobile device 100 can be automatically switched to another Wi-Fi network by performing scanning for another Wi-Fi network, such as either triggered by the doubletap logic in the outer dead zone or by the load-balancing logic in the inner good zone.

While the present invention has been described in connection with certain exemplary embodiments, it is to be understood that the invention is not limited to the disclosed embodiments, but, on the contrary, is intended to cover various modifications and equivalent arrangements included within the spirit and scope of the appended claims, and equivalents thereof.

What is claimed is:

1. A method for managing network traffic on a portable communication device comprising a processor, a memory, and a plurality of network interfaces configured to connect to a plurality of networks, the method comprising:
   intercepting, by a traffic manager running on the processor, network traffic of data to and from an application running on the processor;
   determining, by the traffic manager, a first request to establish a first connection of the application to a remote server;
   selecting, by the traffic manager, a first network specified as a default network among the plurality of networks to use for establishing the first connection;
   monitoring a plurality of network status information for each of the plurality of networks;
   determining, by the traffic manager, a second request to establish a second connection of the application running on the processor to the remote server; and
   selecting, by the traffic manager, a second network from the plurality of networks to use for establishing the second connection when one or more parameters of the network status information for the default network reaches one or more threshold values.

2. The method of claim 1, wherein the network status information comprises a current rate of data being transmitted across each network by the traffic manager over each network; and selecting the second network to use for establishing a second connection based on measurements of bandwidth available in each network of the plurality of networks.

3. The method of claim 1, wherein the network status information comprises a count of currently active requests that are waiting for response data via the first network; and
wherein a request is considered active until corresponding data is received from the remote server in response to the request.

4. The method of claim 3, wherein the request is an HTTP or HTTPS request.

5. The method of claim 3, wherein selecting the second network to use for establishing a second connection is based on a ratio of active requests between the plurality of networks.

6. The method of claim 5, further comprising dynamically adjusting the ratio of active requests for selecting the second network to use for establishing a second connection based on rates at which each network complete requests.

7. The method of claim 5, further comprising dynamically adjusting the ratio of active requests for selecting the second network to use for establishing a second connection based on a response time for a first byte of the response to be received after an active request was transmitted to the remote server.

8. The method of claim 5, further comprising tracking the ratio of active requests separately for different access points of a same network connection type.

9. The method of claim 8, wherein the different network access points of a Wi-Fi network connection are tracked separately based on their SSID and BSSID.

10. The method of claim 8, wherein the different network access points of a cellular network connection are tracked separately based on a type of cellular network connection.

11. The method of claim 10, wherein the type of cellular network connection is selected from a group comprising UMTS, GSM, CDMA2000, and LTE.

12. A non-transitory computer-readable medium storing instructions that, when executed by a processor of a portable communication device comprising the processor, a memory, and a plurality of network interfaces configured to connect to a plurality of networks cause the processor of the portable communication device to:
intercept, by a traffic manager running on the processor, network traffic of data to and from an application running on the processor;
determine, by the traffic manager, a first request to establish a first connection of the application to a remote server;
select, by the traffic manager, a first network specified as a default network among the plurality of networks to use for establishing the first connection;
monitor a plurality of network status information for each of the plurality of networks;
determine, by the traffic manager, a second request to establish a second connection of the application running on the processor to the remote server; and
select, by the traffic manager, a second network from the plurality of networks to use for establishing the second connection when one or more parameters of the network status information for the default network reaches one or more threshold values.

13. The non-transitory computer-readable medium of claim 12, wherein the network status information comprises a current rate of data being transmitted across each network by the traffic manager over each network; and
wherein the non-transitory computer-readable medium further stores instructions that, when executed, cause the processor to select the second network to use for establishing a second connection based on measurements of bandwidth available in each network of the plurality of networks.

14. The non-transitory computer-readable medium claim 12, wherein the network status information comprises a count of currently active requests that are waiting for response data via the first network; and
wherein a request is considered active until corresponding data is received from the remote server in response to the request.

15. The non-transitory computer-readable medium of claim 14, wherein the request is an HTTP or HTTPS request.

16. The non-transitory computer-readable medium of claim 14, wherein selecting the second network to use for establishing a second connection is based on a ratio of active requests between the plurality of networks.

17. The non-transitory computer-readable medium of claim 16, further storing instructions that, when executed by the processor, cause the processor to dynamically adjust the ratio of active requests for selecting the second network to use for establishing a second connection based on rates at which each network complete requests.

18. The non-transitory computer-readable medium of claim 16, further storing instructions that, when executed by the processor, cause the processor to dynamically adjust the ratio of active requests for selecting the second network to use for establishing a second connection based on a response time for a first byte of the response to be received after an active request was transmitted to the remote server.

19. The non-transitory computer-readable medium of claim 16, further storing instructions that, when executed by the processor, cause the processor to track the ratio of active requests separately for different access points of a same network connection type.

20. The non-transitory computer-readable medium of claim 19, wherein the different network access points of a Wi-Fi network connection are tracked separately based on their SSID and BSSID.

21. The non-transitory computer-readable medium of claim 19, wherein the different network access points of a cellular network connection are tracked separately based on a type of cellular network connection.

22. The non-transitory computer-readable medium of claim 21, wherein the type of cellular network connection is selected from a group comprising UMTS, GSM, CDMA2000, and LTE.

* * * * *